June 17, 1958 — J. H. WRIGHT — 2,838,827
CUTTING TOOL
Filed July 11, 1955
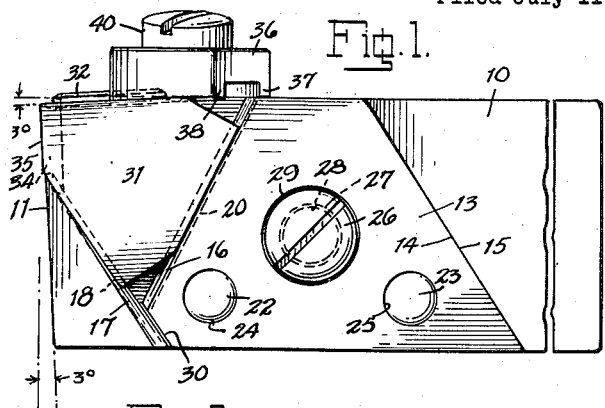
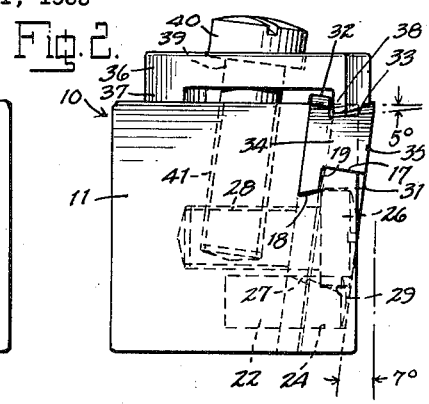
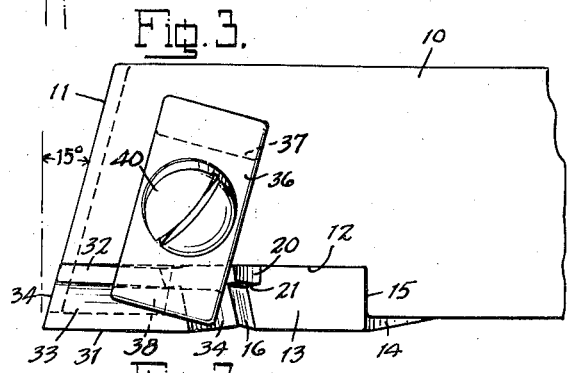
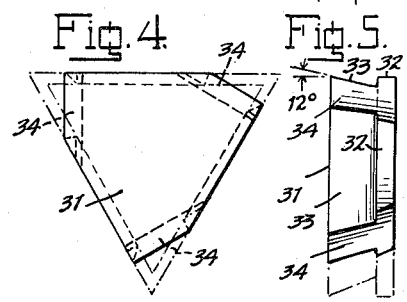
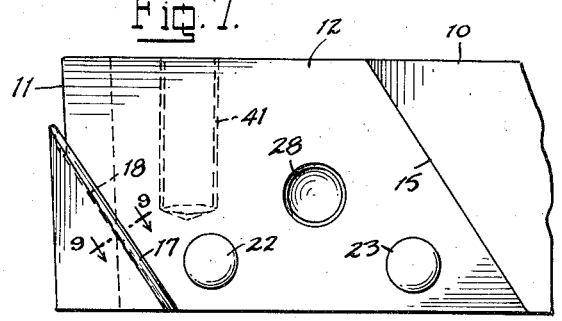
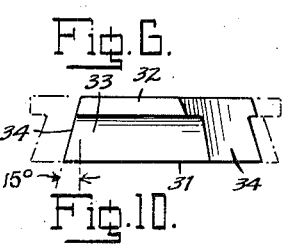
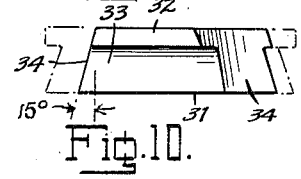
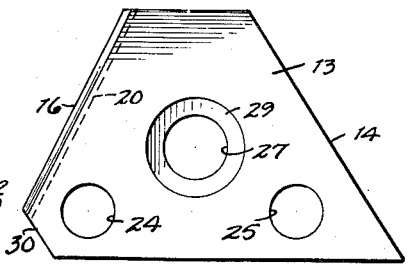
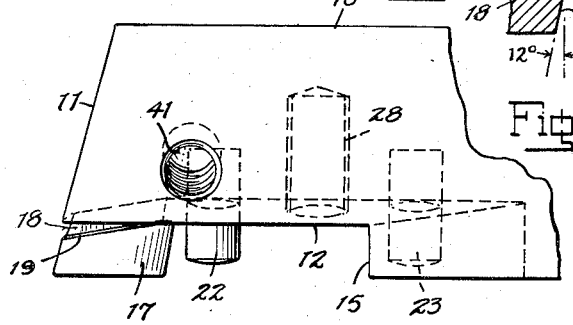
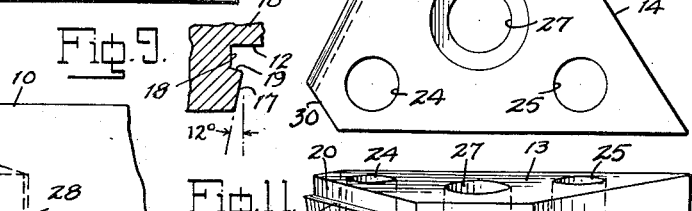
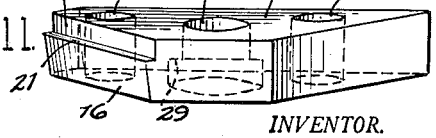
INVENTOR.
JOHN H. WRIGHT
BY
ATTORNEY.

United States Patent Office 2,838,827
Patented June 17, 1958

2,838,827
CUTTING TOOL
John H. Wright, Bridgeport, Conn.
Application July 11, 1955, Serial No. 521,121
1 Claim. (Cl. 29—96)

The present invention relates to a cutting tool for lathes, automatic machine tools, and the like, and particularly a cutting tool having a replaceable cutting tip insert of extremely hard material, as for instance carbide, a preferred type of material being that known in the trade as "Carboloy."

An object of the invention is to provide a tool of this type in which the tip insert is in the form of a flat disc of hard material of polygonal outline shape presenting a plurality of corners, respectively having ground cutting surfaces, which are adapted to be successively placed into cutting position through repositioning of the insert. Thus in the case of a tip insert having three corners, the single insert may have its cutting edge renewed three times during its life, thus greatly increasing the economy of the tool.

A further object is to provide a tool having improved holding means for a replaceable tip insert, whereby the insert may be positioned in the tool so that the holding force thereon will be substantially in a direction parallel to the plane of the insert, and also parallel and in the same direction as the strain placed upon the element through cutting contact with the work during operation, the combined effect of the cutting force upon the insert and the arrangement of the holding means being such as to increase the holding action as there is an increase in the strain imposed by the cutting action and to not directly impose the cutting strain upon the holding means.

Another object is to provide cooperative holding means for the tip insert which positively retains it against displacement in all directions.

A further object is to provide a tool in which the replaceable tip insert is free from holes or other weakening structure, such as previously provided in certain types of replaceable tips for receiving holding screws and the like.

Another object is to provide a tip insert having integral chipper means for cooperation with the cutting edge.

Other objects and advantages of the invention will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 1 is a side elevation of the cutting tool of the invention, the intermediate portion of the shank of the tool being broken away;

Fig. 2 is a forward end view;

Fig. 3 is a top plan view of the forward end portion of the tool;

Fig. 4 is a front elevation of the cutting tip insert member, the dot-and-dash lines indicating the ground-away corner portions of the triangular blank from which the tip member is formed;

Fig. 5 is a side elevation as seen from the right in Fig. 4, also showing in dot-and-dash lines the ground-away portions of the blank;

Fig. 6 is a top elevation, also showing in dot-and-dash lines the ground-away portions of the blank;

Fig. 7 is a front elevation of the forward end portion of the shank;

Fig. 8 is a top plan view thereof;

Fig. 9 is a detail sectional view taken along the line 9—9 of Fig. 7;

Fig. 10 is a front elevation of the tip backing up block member detached from the shank; and Fig. 11 is a top plan view thereof.

Referring to the drawings the cutting tool, according to the illustrated exemplary embodiment of the invention, comprises an elongated body member or shank 10 of rectangular, preferably square, cross section having its forward end wall 11 inclined inwardly and downwardly from its upper transverse edge at a relatively small angle, 3° as indicated in the illustrated embodiment, and inclined inwardly and rearwardly from its forward edge at a substantially greater angle, 15° as indicated in the illustrated embodiment.

At its front side, adjacent its forward end, there is provided a recess 12 extending diagonally from the top to the bottom wall in inwardly and rearwardly inclined direction, the forward wall of this recess opening into the forward end wall 11 of the shank for a substantial distance below its upper edge. The recess 12 also inclines rearwardly from its top to its bottom edge at a predetermined angle at which the cutting tip insert is set into the tool, as will hereinafter more fully appear, this angle in the illustrated embodiment being indicated as 7°.

A block member 13 is secured in the recess 12, and is of generally truncated triangular shape with its front and rear walls at an angle to its top and bottom walls corresponding to the angle of the recess 12, i. e. 7° in the illustrated embodiment. The rearward wall 14 of the block member is inclined at the same angle as the rearward wall 15 of the recess 12, and in the assembled relation engages against the wall 15, while the forward wall 16 of the block member is at a reverse angle to the forward wall 17 of the recess 12, so that in the assembled relation of the block member the walls 16 and 17 form the lower downwardly and inwardly inclined sides of a substantially triangular pocket for receiving the cutting tip insert, as will more fully appear.

As shown in Fig. 8, the wall 17 of the recess is bevelled at an angle to fit the side of the tip insert, this angle being 12° in the illustrated embodiment, and adjacent the back wall of the recess is provided with a groove 18 for receiving in interlocking relation a flange portion of the tip insert, the forward wall 19 of this groove being slightly bevelled so as to receive the flange with a wedging fit, as will presently more fully appear.

The edge 16 of the block 13 is substantially similarly formed to the edge 17, being inclined at an angle to fit the side of the tip insert, 12° in the illustrated embodiment, and having a groove 20 adjacent the rearward wall, the forwar wall 21 of the groove being slightly bevelled to receive the flange of the insert with a wedging fit.

The block member 13 is positioned within the recess 12 by a pair of longitudinally spaced parallel dowel pins 22 and 23 set into the shank and having their axes parallel to the top and bottom walls of the shank, and which engage holes 24 and 25 provided in the block member 13. The block member is secured by a headed screw 26 engaged through a hole 27 in the block member and screwed into a threaded hole 28 in the shank, the head of the screw being seated in a countersunk recess 29 at the outer end of the hole 27. The axis of the screw 26 is parallel to the axes of the dowels 22 and 23, so that by positioning the block member upon the dowels and tightening the screw, the block member is brought tightly into the recess 12. The lower forward corner of the block member is cut away as at 30 so as to clear the lower portion of the wall 17 of the recess 12.

The cutting tip insert 31, which is formed of very hard metal such as carbide, consists of a flat disc-like piece of generally triangular form, being first produced as a triangular blank having a flange 32 extending about its three sides adjacent its rearward wall and having its peripheral side surfaces 33 between its forward wall and the flange inclined downwardly and inwardly to the forward side of the flange, the inclination in the illustrated embodiment being indicated as 12°. At each corner, identical flat cutting faces 34 are ground, each of which is in a plane at right angles to one adjacent side, and which plane inclines from the front to the rear wall at an angle substantially corresponding to the angle at which the forward end of the shank is inclined from front to rear, i. e., 15° in the illustrated embodiment.

As shown clearly in Figs. 1–3, the tip insert seats in the substantially triangular pocket in the forward end of the shank with its flanges 32 along the two lower sides fitting into the grooves 18 and 20, the angularity of the sides of this pocket being predetermined so that the tip insert is tilted forwardly at its upper forward corner at the same angle as the angle of downward and inward inclination of the forward end of the shank, i. e., 3° in the illustrated embodiment. In addition to being tilted forwardly, it is also tilted downwardly and inwardly from its upper side to its lower corner in correspondence to the angle of the recess 12, 7° in the illustrated embodiment. Thus, the active cutting edge of the tip, indicated at 35, is disposed along a line which is at an angle of 3° in the longitudinal direction of the tool, and 7° in the transverse direction, while the upper edges extending longitudinally and transversely from the upper end of the edge 35 are each disposed at a rake angle, the longitudinally extending edge as illustrated in Fig. 1 being at a 3° negative rake angle, as indicated, and the transverse edge being at a 5° side rake angle, as indicated, the 5° being the result of the difference between the 12° angle of the side 33 of the tip and the 7° angle at which the tip insert is disposed within the recess 12.

The tip insert is secured in the pocket by a clamp member 36 having a rearward fulcrum leg 37 resting upon the top surface of the shank and a forward clamping leg 38 having a forward and downward inclination of substantially 3°, and a rearward and downward inclination of substantially 5° to fit against the upper inclined side surface 33 of the tip insert. A countersunk hole 39 is provided in the clamp and is engaged by a headed screw 40 screwed into a threaded hole 41 extending downwardly in the shank with its axis substantially parallel to the inclined base surface of the recess 12, so that as the clamp is tightened downwardly it also pulls inwardly upon the upper side of the tip insert.

It is noted that in the operation of the tool, the strain of the cutting action upon the edge 35 is imposed downwardly and rearwardly substantially in the plane of the tip insert, thus forcing it toward the walls 16 and 17 forming the lower sides of the tip receiving pocket, so that the greater the strain upon the tool the more firmly the tip is seated in the pocket. At the same time the tool is firmly held in the pocket by the clamp 36, which also exerts its force in the plane of the tip and substantially in the same direction as the strain of the cutting action. Thus the strain of the cutting action is not directly opposed to the direction of the holding force of the clamp.

Whenever the active edge of the tip insert becomes worn, the clamp 36 may be loosened and the tip insert turned to bring a new cutting edge into place, a single tip insert thus providing three cutting edges. It is also noted that the edge of the flange 32 adjacent the active cutting edge acts in conjunction with the cutting edge as a chipper, thus eliminating the necessity for a separate chipper plate where a chipper action is desired.

What is claimed is:

A cutting tool comprising a shank including a forward end wall, top and bottom walls, and front and rear side walls, said front side wall having a tip insert receiving pocket of substantially equilateral triangle shape including a back wall and forward and rearward walls inclined downwardly toward each other, said rearward inclined wall extending to said top wall and said forward inclined wall extending to said forward end wall at a point below said top wall whereby said pocket has an open upper end within said top wall and an open forward end within said forward end wall, a flat disc-like tip insert member of substantial equilateral triangle shape having inner and outer flat faces, said insert member being removably engaged in said pocket with its inner face against said back wall thereof, with two of its sides respectively engaged with said forward and rearward inclined walls, and with its third side disposed in said open upper end of said pocket, said insert member having a ground surface at each of its corners disposed in angular relation to its sides and providing cutting edges, each indentically disposed relatively to the center point of said insert member, one of said corner surfaces being disposed in cutting position in said forward open end of said pocket, and the other corner surfaces adapted to be successively brought into said cutting position through repositioning of said insert member, said forward and rearward walls of said pocket and the sides of said insert member each having interengaging locking formations to retain said insert member against transverse displacement away from said back wall of said pocket, and clamping means carried by said shank and engaging the side of said insert member disposed in said open upper end of said pocket to retain said insert member against upward movement in said pocket.

References Cited in the file of this patent
UNITED STATES PATENTS

| | | |
|---|---|---|
| 1,045,512 | Carr | Nov. 26, 1912 |
| 1,397,357 | Bronander | Nov. 15, 1921 |
| 1,838,520 | Archer | Dec. 29, 1931 |
| 1,920,035 | Stephens | July 25, 1933 |
| 2,310,992 | Proksa | Feb. 16, 1943 |
| 2,414,811 | Hollis | Jan. 28, 1947 |
| 2,645,844 | Longe | July 21, 1953 |

FOREIGN PATENTS

| | | |
|---|---|---|
| 1,084,955 | France | Jan. 26, 1955 |

OTHER REFERENCES

Article, "Tool Blanks," from Scientific American, July 1945.